April 17, 1951  R. POLK, SR., ET AL  2,549,333
METHOD FOR SECTIONIZING CITRUS FRUITS
Filed March 27, 1946  5 Sheets-Sheet 1
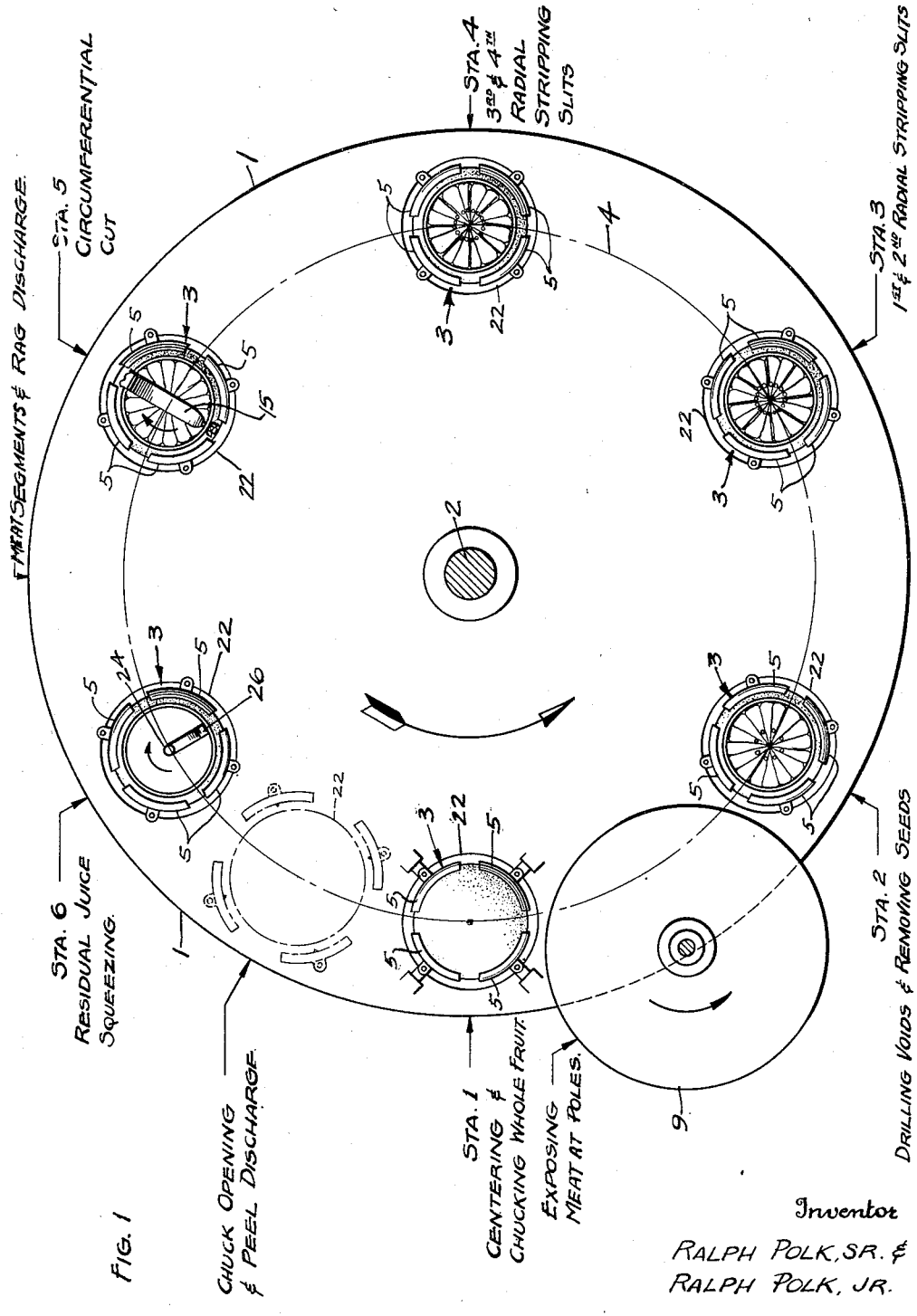
Inventor
RALPH POLK, SR. &
RALPH POLK, JR.
By Semmes, Keegin, Beale and Semmes Attorney

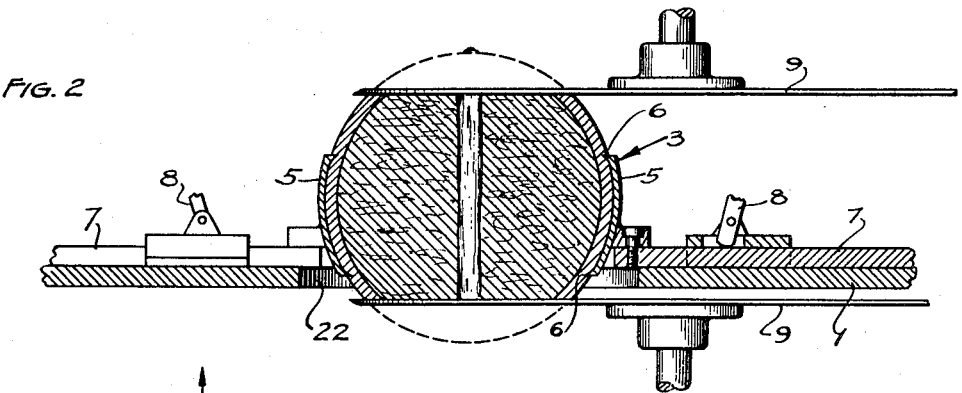
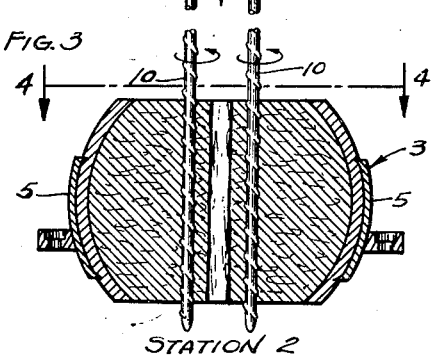
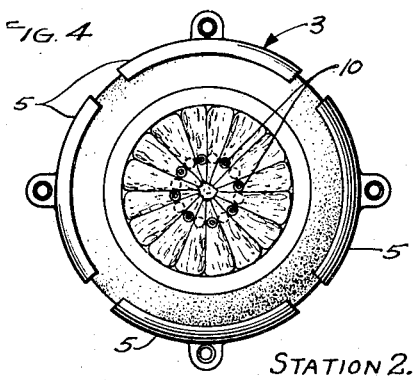
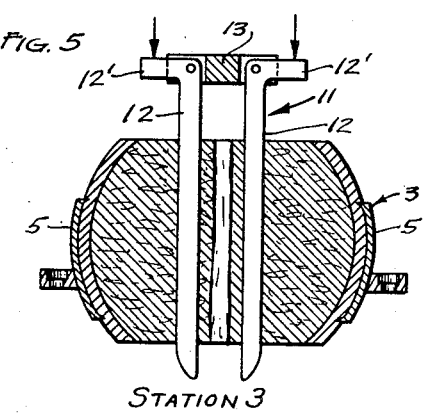
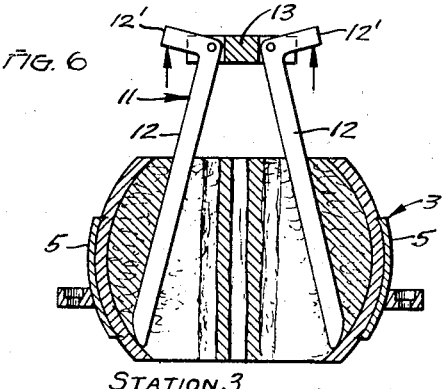

April 17, 1951   R. POLK, SR., ET AL   2,549,333
METHOD FOR SECTIONIZING CITRUS FRUITS
Filed March 27, 1946   5 Sheets-Sheet 3
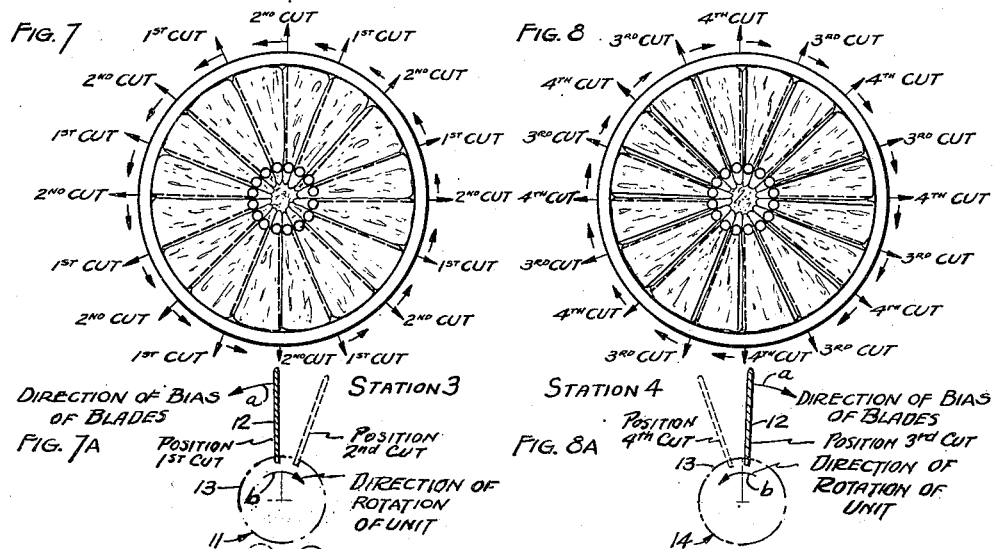
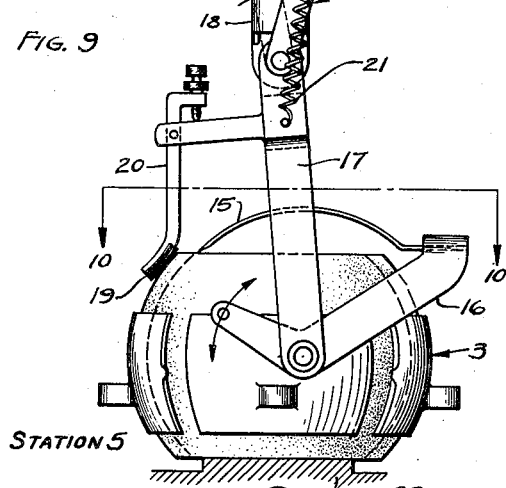
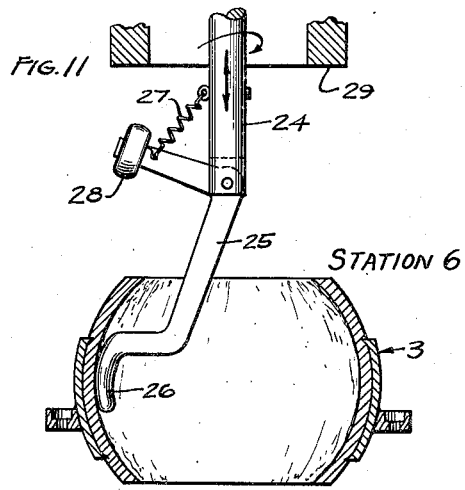
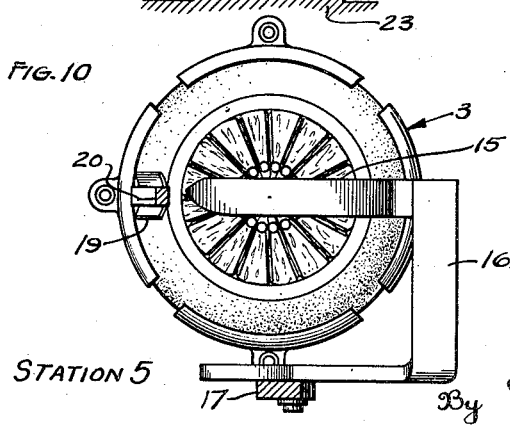
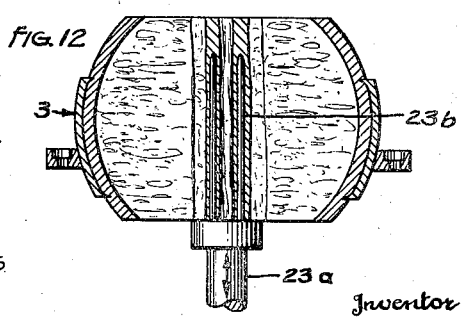
Inventor
RALPH POLK, SR. & RALPH POLK, JR.

April 17, 1951  R. POLK, SR., ET AL  2,549,333
METHOD FOR SECTIONIZING CITRUS FRUITS
Filed March 27, 1946  5 Sheets-Sheet 4
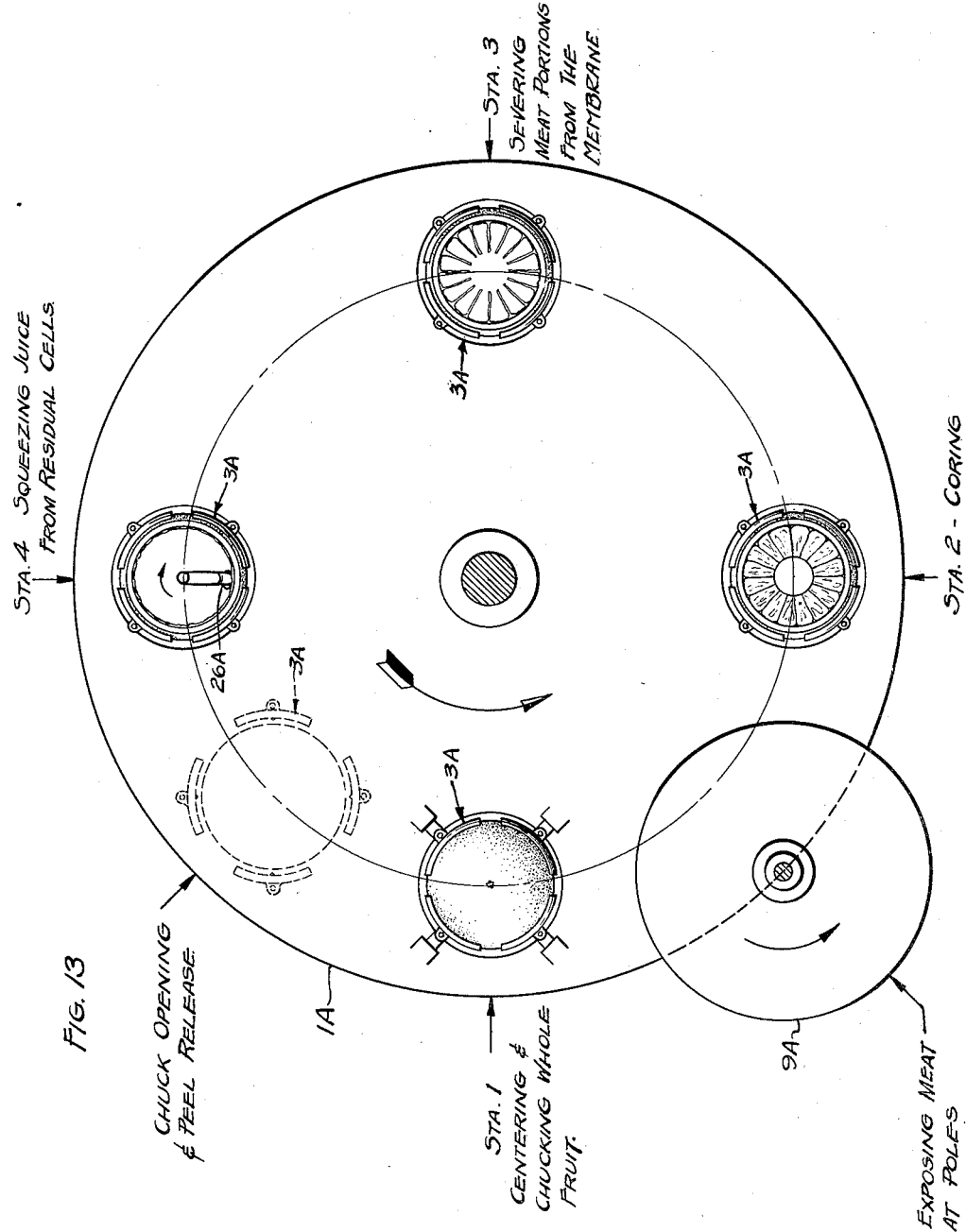
INVENTOR.
RALPH POLK, SR. & RALPH POLK, JR.
BY
Semmes, Keegin, Beale and Semmes
ATTORNEY April 17, 1951  R. POLK, SR., ET AL  2,549,333
METHOD FOR SECTIONIZING CITRUS FRUITS
Filed March 27, 1946  5 Sheets-Sheet 5
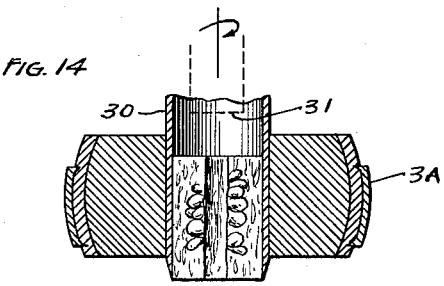
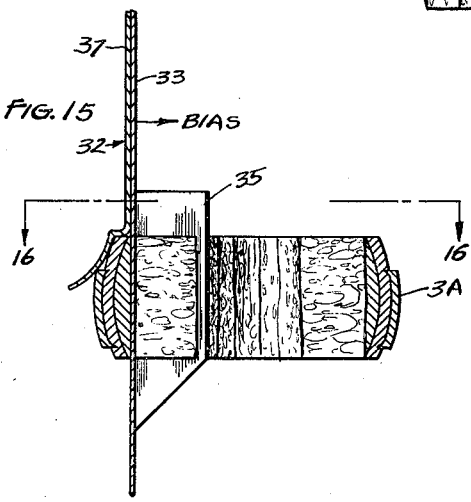
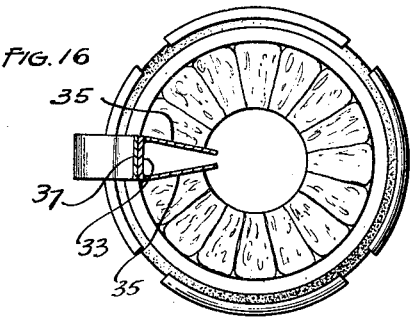
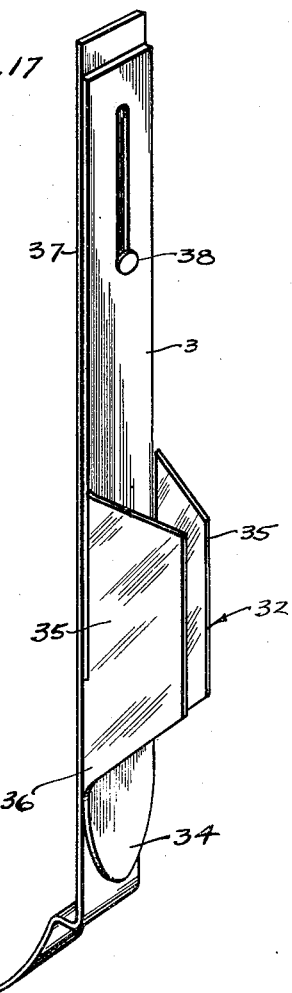
INVENTOR.
RALPH POLK, SR. & RALPH POLK, JR
BY
Semmes, Keegin, Beale and Semmes
ATTORNEY Patented Apr. 17, 1951

2,549,333

UNITED STATES PATENT OFFICE 2,549,333

METHOD FOR SECTIONIZING CITRUS FRUITS

Ralph Polk, Sr., Miami, and Ralph Polk, Jr., Tampa, Fla., assignors to The Polk Development Company, Tampa, Fla., a copartnership of Florida composed of Ralph Polk, Sr., and Ralph Polk, Jr.

Application March 27, 1946, Serial No. 657,506

9 Claims. (Cl. 146—236)

This invention relates generally to the sectionizing of citrus fruit and more particularly to a method and apparatus for removing well defined, membrane-free bodies of the meat from citrus fruit while supporting the fruit during the removal operation by an equatorial band of its peel.

The meat of citrus fruit is composed of masses, or carpels, of interconnected fruit juice sacs, each mass or carpel being in the form of a segment and surrounded by a carpellary membrane commonly known as the "segment wall." In this application, the term "segment" shall refer to the segment as naturally occurring in the fruit and including both the meat and surrounding wall or membrane while the term "meat segment" shall refer to the segment of meat freed from its enclosing wall or membrane. The portions of the segment wall, which extend more or less radially from the core in the whole fruit and define the plane faces of the segments, will be referred to as "radial membranes," while the portion of the segment wall which lies adjacent the peel of the fruit and defines the spherical face of the segments will be referred to as the "outer membrane."

Sectionizing, or the removal of the naturally shaped membrane-free meat segments from citrus fruit, particularly grapefruit, is generally performed by first peeling off the outer skin and albedo, next subjecting the peeled fruit to a hot lye treatment to remove the outer membrane from the segments, and then stripping individually the segmental juice sac groups from their radial membranes by hand. This method, however, is slow and costly, requiring skilled labor both for the peeling and the segmenting operations.

We have devised and developed machinery for sectionizing peeled citrus fruit in which fruit, peeled sufficiently deep to remove not only the rind but also the outer membrane, is supported by a non rotating, circular series of prongs inserted polarwise into the fruit in the apex angles of the segments. While thus holding the fruit by the radial membranes, the segmental meat portions are stripped bodily from the radial membranes either by the severing action of dull edge slitting knives alone; or by the combination of the slitting action of knives which sever the meat segments from one of their radial membranes plus centrifugal force, or the rubbing action of a circular series of prongs, rotatable concentrically with and relative to the series of holding prongs, which strips the meat segments from their other radial membrane as the membranes are wrapped spirally about the group of holding prongs.

This machinery has proved very effective in sectionizing certain types of fruit. We have found that the fruit must be mechanically peeled appreciably below the outer membrane because it has been found that the hot lye treatment fails to remove certain undesirable portions closely adjacent the outer membrane. We have also found that with certain other types of fruit, particularly seedless varieties and fruit at certain stages of maturity and storage or maturing under certain adverse conditions, the radial membrane adjacent the core of the fruit is weak and tears away from the holding prongs with the meat during the stripping operations. On the other hand, we have found that in all fruit, both seed and seedless varieties, and in average condition, the membrane is extremely tough in the outer regions of the fruit.

It is the principal purpose of this invention, therefore, to provide a new method of sectionizing citrus fruit in which the segments are supported, during the sectionizing operations, by an equatorial band of peel left intact on the fruit.

Another object of the invention is to provide a method and apparatus for sectionizing or removing well defined, membrane-free bodies of juice sac groups from citrus fruit without the necessity of first peeling the fruit in the accepted meaning of the term.

Another object of the invention is to provide a method and apparatus for removing desired products from citrus fruit in which peel and outer membrane is removed from adjacent the poles of the fruit to expose the meat of the segments, juice sac groups are severed in well defined bodies from their membranes, the bodies removed, and then remaining juice sacs are ruptured to extract the juice, all while supporting the fruit by an equatorial band of its peel.

A further object of the invention is to provide a method and apparatus for sectionizing citrus fruit in which peel and outer membrane are removed from whole citrus fruit adjacent the poles thereof to expose the meat of the segments, meat bodies are severed completely from their radial membranes and then the meats and radial membranes are severed from the outer membranes and peel while supporting the fruit by an equatorial band of peel left intact thereon.

A still further object of the invention is to provide a method and apparatus for sectionizing citrus fruit in which an equatorial band of peel is left intact on the fruit to support the same, radial slits are made in the segments from the apices thereof to the outer membrane closely adjacent their radial membranes, the segment meats are separated from said radial membranes and then a spherical cut is made closely adjacent the inner surface of the outer membrane to sever the meat segments and radial membranes from the outer membrane.

Generally, the invention comprises exposing the fruit segments beneath the outer membrane at the poles of citrus fruit such as grapefruit, while leaving a substantial equatorial band of skin intact on the fruit, and then severing the meat portions bodily from the membrane along lines closely adjacent the membrane, supporting the fruit while operating upon it by the equatorial band of skin. In one embodiment of the invention substantially full segments are first completely severed from the radial membranes and then the meat portions and radial membranes are severed from the outer membrane and peel. In a modification of the above method, the meat portions are completely severed from the radial and outer membranes at the same time, and the radial membrane is left attached to the outer membrane and peel.

In both cases, preferably, the juice sacs remaining after the meat portions are removed, are ruptured to recover the juice.

More specifically, in the first method—that is, removing substantially whole meat segments—the peel and outer membrane are first removed adjacent both poles of the fruit leaving a substantial equatorial band of peel surrounding the segments. This may be done by peeling or making a generally spherical or conical cut, but conveniently and rapidly it is accomplished by so called "stubbing"—that is, removing polar caps from the fruit along parallel planes normal to the polar axis. Preferably, axial voids are next formed in the apices of the segments in the angles between the divergent radial membranes of the segments, which also serves to remove seed. Next the meat portions of the segments are severed from the radial membranes preferably by a slitting action, closely adjacent the radial membranes, from the apex to the outer membrane. After this, the meat portions and radial membranes are severed from the peel and outer membranes, preferably by a spherical cut closely adjacent the inner surface of the outer membrane. The meat portions may then be separated from the membrane or "rag."

After the segments are removed, unruptured juice sacs remaining in the band of peel may be broken to extract the juice by a rotary rubbing action around the inside of the peel, pressure being exerted radially outward against the peel. It may be stated that the juice may also be extracted from the removed polar caps of the fruit and also, if desired, from sacs adhering to the removed radial membrane, by well known methods. This last mentioned juice extraction, however, forms no part of this invention.

It is to be noted that during the above segmenting operations, the fruit segments and radial membrane both remain attached to the peel until the spherical cut just inside the outer membrane is made. Neither the meat portions, as segments, nor the membranes are subjected to stretch or tearing stresses; the meat portions are removed as whole segmental bodies and the radial or inner membrane is removed as a unitary piece to greatly facilitate subsequent segregation.

In the second or modified method, the fruit is "stubbed" as described above, but in this case, preferably, larger polar cap pieces are sliced off perpendicular to the polar axis, leaving a center section with the peel intact, approximately two inches thick for an average five inch grapefruit, for example. Preferably, also this section is cored to remove the seed and inner portions of the radial membrane. Meat portions of the segments are then removed from the remaining membrane in a single operation by a severing action in a direction substantially parallel to the polar axis of the section and closely adjacent the membranes. In this case, conveniently, the segment is cut adjacent the outer membrane also on a line parallel with the axis rather than following the spherical curvature as in the first described method.

After the meat portions are thus removed, the unruptured juice sacs remaining adhering to the membranes, and those composing segments too narrow for practical removal, may be ruptured by the above described outward radial pressure against the peel and the juice extracted therefrom.

The meat products of this modified method is somewhat shorter than by the preferred method and are generally trapezoidal in cross section. The modified method is much more rapid than the first, however, and the smaller size products are desirable for certain uses, being marketed under the designation "tid-bits."

It will be noted that in carrying out either of the above processes, the fruit is held and advanced from step to step by the band of peel.

While either of the above processes may be carried out by hand operations, they are preferably carried out, for rapid production, by automatically operated machine. For the purpose of the present application, there is illustrated in the accompanying drawings, somewhat diagrammatically, apparatus which may be actuated by suitable power driven mechanisms for performing the operations described above. It is to be understood that the particular apparatus illustrated is shown by way of example only and the broad concept underlying the invention is not to be limited by the particular apparatus shown and described.

In the drawings:

Figure 1 is a diagrammatic view illustrating the cycle of operations in carrying out the invention according to one process.

Figure 2 is a transverse sectional view of a piece of fruit showing diagrammatically a means for holding the fruit and removing the polar caps.

Figure 3 is a transverse sectional view of a piece of fruit showing diagrammatically a means to form axial voids in the capped fruit.

Figure 4 is a cross sectional view taken on line 4—4 of Figure 3.

Figure 5 is a longitudinal sectional view of the fruit showing a meat slitting knife unit and showing diagrammatically the action of meat stripping blades on their down stroke.

Figure 6 is a view similar to Figure 5 showing diagrammatically the action of the stripping blades on their up stroke.

Figure 7 is a view similar to Figure 5 showing diagrammatically the locations of the first and second stripping cuts made by a first stripping knife unit.

Figure 7A shows diagrammatically the bias of the blades in the first and second stripping cuts and the direction of rotation of the knife unit between the first and second cut.

Figure 8 is a view similar to Figure 7 showing the locations of the third and fourth stripping cuts made by a second stripping knife unit.

Figure 8A shows diagrammatically the bias of the blades during the third and fourth stripping cuts and the direction of rotation of the second knife unit between the third and fourth cuts.

Figure 9 is a side elevational view showing somewhat diagrammatically one form of knife structure which may be employed for making a spherical cut to remove the meat segments and radial membranes from the skin.

Figure 10 is a sectional view taken on the line 10—10 of Figure 9.

Figure 11 is a transverse sectional view of the fruit peel showing diagrammatically a means for squeezing juice from residual juice cells therein.

Figure 12 is a sectional view partly in elevation showing additional means which may be employed in supporting the fruit.

Figure 13 is a diagrammatic view illustrating the cycle of operation for removing meat portions from fruit according to a modified process.

Figure 14 is a transverse sectional view of a piece of fruit illustrating diagrammatically a tool for performing the coring step of the process shown in Figure 13.

Figure 15 is a view similar to Figure 14 showing in longitudinal section a tool for performing the meat severing step of the process shown in Figure 13.

Figure 16 is a cross sectional view taken on the line 16—16 of Figure 15.

Figure 17 is a perspective view of the tool shown in Figures 14 and 15 which may be employed in severing the meat portions.

Referring first to Figure 1, there is illustrated diagrammatically a fruit supporting table or carriage 1 which is rotatable, preferably, about a vertical axis 2. Positioned on the carriage 1, concentric with its rotational axis, is a circular series of equally spaced chucks, designated generally as 3, for holding the fruit to be operated on and advancing it from a loading station to a plurality of succeeding stations for the successive operations of the process. The carriage 1 may be rotated in step by step movement in well known manner, such as by a Geneva drive (not shown) to bring the chucks in operative position at the several operating stations.

The fruit is centered in the chucks, either by hand or suitable mechanism, with its polar axis or core vertical and coinciding with a circular path (indicated by the dotted line 4) passing through the center of the several operating units to be described. Since the core or polar axis of citrus fruit is very seldom at the exact center of the fruit, the chucks 3 are preferably provided with a plurality of independently movable fruit gripping jaws 5 provided with concave faces which engage the outer peel of the centered fruit at substantially, or slightly below, the horizontal mid-section.

Referring to Figure 2, short prongs or teeth 6 may be provided on the chuck jaws to penetrate the peel slightly and assist in holding the fruit. The jaws 5 are movably attached to the table, such as by movable supporting members 7 and preferably engage the fruit with substantially equal pressure to maintain its centered position and natural shape of the peel throughout the process. The jaw pressure may be maintained until released after the final process step, by suitable, one-way restraining means such as sprags 8 engaging the supporting members 7.

Located between the loading station of the machine (station 1, Fig. 1) and station 2, are a pair of parallel, capping or "stubbing" knives 9. These knives, as best seen in Figure 2, are preferably circular knives mounted on separate shafts but preferably rotating about a common vertical axis. The knives are spaced apart and relative to the fruit to cut off substantially equal polar cap portions as the fruit is advanced from station 1 to station 2. These cuts are preferably made deep enough polarwise of the fruit to expose the meat of the segments at opposite ends of the fruit as shown in Figures 2 and 4.

At station 2 of the machine, which may be termed the drilling station, is located a circular series of drills 10, rotatable about vertical axes and adapted to be fed downwardly through the segments adjacent their apices to remove the seed and form small voids through the segments to aid in the following operations. These drills may be of the type disclosed in our Patent No. 2,155,768 and consist essentially of spiral fluted augers having tapered but rather blunt points which follow the membrane structure in passing through the segments leaving the membrane intact. The arrangement and operation of these drills is well set forth in the above patent and it is not thought necessary to go into a detailed description here. It might be pointed out, however, that each of the major segments, that is, all but very narrow ones, should be drilled. This may be accomplished by feeding the series of drills through the fruit more than once, rotating the series about its axis between successive feeds. Alternately, a second, and following, drilling station may be provided in the machine. Suitable mechanism may be provided for operating the drills.

After the above apex voiding and seed removal is performed, the fruit is advanced to station 3 of the machine where a first slitting operation is performed to sever the meat of the segments from one of their two radial membranes. This is accomplished by a circular series of slitting knives positioned about a vertical axis coinciding with the core of the fruit and capable of a vertical feed movement. These slitting knives may be of one of the various types disclosed in patents already issued to us. For example, they may be generally of the type disclosed in Patent No. 2,240,098, consisting of pairs of relatively narrow angularly disposed blades, which enter the segments downwardly adjacent the apices and are then swung outwardly to follow the radial membrane lines of the segments to sever the meat from both membranes simultaneously on the up-stroke of the blades. We prefer, however, to perform the slitting operation in a series of steps.

To this end, a knife unit 11 comprising a circular series of vertically extending, substantially radially disposed, narrow and dull edged blades 12 is positioned at station 3 with the axis of the series coinciding with the core of the fruit. The series of blades 12 are preferably supported on a common carrier 13 capable of imparting a vertical reciprocating feed stroke to the blades as indicated in Figures 5 and 6 and also for imparting a limited rotary movement to the series about the axis of the series, as indicated in Figures 7 and 7A and as will be described. The individual blades are preferably flexible laterally or flexibly connected to the carrier 13 to permit a limited movement of the free ends of the blades relatively with respect to each other. Each blade 12 is also attached to the carrier 13 for swinging movement radially with respect to the axis of the series and also for limited rotational movement about its own axis. As indicated diagrammatically in Figures 5 and 6, respectively, the blades are urged radially toward the core of the fruit, to coincide with the previously drilled voids, on the down-stroke of the knife unit, and are urged radially, and preferably resiliently, outwardly toward the peel of the fruit on the up-stroke of the unit. As indicated by the arrow *a*, in Figure 7A, the individual blades are each resiliently biased about its own rotational axis in the same circumferential direction in the series. In other words, the blades of the series are all biased toward the same relative radial membrane of the fruit segments.

As seen in Figure 5, on the down-stroke of the knife unit, the blades 12 pass completely through the voids of the segments closely adjacent the apices thereof. The flexibility or the flexible mounting of the individual blades permit them to enter the meat of the segments regardless of any irregularity of segment size or arrangement while the individual rotational bias of the blades will cause each blade to lie closely adjacent the same relative face of the radial membrane of the segments.

When the blades reach the bottom of the stroke, the radially inward bias is released and the radially outward bias imposed on the blades which causes them to swing radially outward from the apices of the segments, still following the radial membrane to the peel or outer membrane, as shown in Figure 6. Then on the up-stroke of the unit, the blades follow the skin profile and completely sever the meat segments from one face of these radial membranes.

Any convenient means may be provided for changing the direction of bias about the swinging action of the blades. By way of example, the blades may be provided with right angular extensions, such as shown at 12', adjacent their swinging pivots and the unit may be fed on its down-stroke by pressure on the upper edges of these extensions as diagrammatically indicated by arrows in Figure 5, which urges the free ends of the blades toward the center of the fruit. On the up-stroke of the unit, pressure may be exerted on the bottom edges of the extensions which urges the free ends of the blades toward the peel, as indicated by arrows in Figure 6.

Preferably, because of the irregularity in number of segments in individual fruit the above severing operation is carried out in two or more feed strokes of the knife unit with the number of blades in the unit corresponding about to half the maximum number of segments found in the fruit. For example, grapefruit may, in some fruit, have 16 segments and it has been found that a series of eight blades will make the radial slit in each major segment in the average run of fruit. Between successive strokes, the blade series is rotated about the axis of the unit through an angle equal to the apex angle of an average segment, as indicated by the arrow *b* in Figure 7A. Figure 7 shows graphically how each segment is slit radially adjacent the same relative face of all the membranes in two cuts or strokes of the knife unit.

Next, the machine advances the fruit to station 4 where the meat of the segments is severed from the opposite radial membrane by a knife unit 14, which may be similar in construction and operation with the unit 11. The individual blades of the unit 14, however, are biased about their axes in an opposite direction from those in the unit 11 and the unit 14 is preferably rotated in the opposite direction between strokes, as indicated by the direction arrows in Figure 8A, in order that the blades may follow the opposite membrane, as shown in Figure 8.

After the above slitting operations, the fruit is advanced to station 5 where the meat and radial membranes are severed from the outer membrane and peel. Here a curved blade 15, having a curvature corresponding to that of an average fruit, and a sharp cutting point, is attached to an arm 16 which has a pivotal connection with a supporting bracket 17 which is, in turn, pivotally connected to a rotatable drive shaft 18 axially aligned with the core of the fruit at this station. As will be clearly seen in Figures 9 and 10, the curved blade 15 is concentric with the pivot of the arm 16 so that rotation of the shaft 18 and movement of the arm 16 about its pivot will cause the point of the blade 15 to move in a spiral path and the blade to make a somewhat spherical cut.

Because fruits are of different sizes, and because of the fact that fruit is very seldom round and the polar axis is very seldom in the center of the fruit, preferably the point of the blade should be guided by the cross sectional peel contour. In order to correctly gauge the position of the point of the blade 15 with respect to the inner surface of the outer membrane when the blade initially penetrates the fruit, a follower or finger 19 is provided to engage and follow the contour of the peel as the shaft 18 revolves. This follower is attached to one end of an arm 20 carried by the bracket 17. Resilient means such as a spring 21 between the bracket 17 and shaft 18, is provided to urge the follower either in a direction to engage the peel, or in the opposite direction away from the peel. This may be accomplished by attaching one end of the spring 21 to the bracket 17 and the opposite end to the free end of a lever 21' pivotally connected to the shaft 18 and which may be conveniently flipped, as indicated in Figure 9, to position the spring 21 on one side or the other of the pivot point of the bracket 17. Preferably, as the fruit is positioned at station 5, the lever 21' is flipped to urge the follower 19 into engagement with the peel which moves the bracket 17 to the right, as seen in Figure 9, and causes the point of the blade 15 to engage the segments just inside the outer membranes. After the blade has penetrated the meat the lever 21 may be flipped in the opposite direction to urge the bracket 17 and blade toward the inner surface of the peel, the resiliency of the spring causing the blade to follow closely the peel contour.

Preferably, the follower 19 has an adjustable connection with the bracket 17 to be capable of adjustment toward and away from the point of the knife 15 in order that the device may be adjusted for different peel thicknesses. This adjustment is made so that the point of the knife enters the fruit just inside the outer membrane and as the knife is operated as described above, the segment meats and the radial membrane are severed from the peel and outer membrane closely adjacent the inner face of the outer membrane.

When completely severed, the meats and radial membrane or rag will drop or may be forced out of the peel through an appropriate hole 22

(see Fig. 2) in the table 1 and into suitable collection receptacles, and the rag and meats then segregated. It may be desirable during this last severing operation to support the fruit axially. If so, a suitable support such as indicated at 23 may be provided.

Mechanical limitations make it almost impossible to so sever the meat from the outer membrane as to obtain all of the juice sacs in the severed meat segments, and consequently a number of unruptured sacs will remain attached to the outer membrane. To recover this juice the peel may be advanced to a sixth station where these remaining juice sacs may be ruptured. A tool for performing this operation is shown in Figure 11 and may comprise a shaft 24, rotatable about a vertical axis coinciding with the axis of the peel, and having pivotally connected at its lower end, a bell crank arm 25. The depending end of the arm 25 is provided with an arcuate, offset, rubbing element 26 having a rounded face adapted to engage the inner surface of the peel. The rubbing element 26 is resiliently biased in a direction radially outward from the axis of rotation of the shaft 24 by means such as a spring 27 connecting the opposite end of the bell crank arm 25 with the shaft 24. The shaft 24 is capable of axial as well as rotative motion, as indicated by the arrows; and the bell crank may be provided with a roller 28 which, in the up position of the shaft, engages a circular stationary track 29 to move the rubbing element toward the axis of rotation of the shaft against the action of the spring 24.

When the peel is moved to station 6, the rotating shaft 24 is lowered, and as the rubbing element 26 approaches the upper end of the peel, the roller 28 disengages the track 29 and the rubbing element is urged outwardly into spring pressed engagement with the inner surface of the peel. This rubbing element moves, with continued downward movement of the rotating shaft 24, in a spiral path, following the contour of the peel, rupturing the juice sacs adhering thereto and releasing the juice, which may thereupon be suitably collected. At the end of the downstroke the shaft 24 is retracted to its up position.

As the chuck 3 and peel are advanced from the last station back to the loading station, the chuck is opened by releasing the sprags 8 and the peel drops out through the opening 22 in the table.

Under certain conditions and for certain kinds of fruit, it may be desirable to provide support for the meat and membrane structure during certain of the sectionizing operations, particularly while making the spherical cut, in addition to the chuck and peel support described. To this end, there may be provided a series of vertical spindles 23A, such as shown in Figure 12, equipped with a circular group of upright prongs 23B adapted to penetrate axially at least a portion of the segments closely adjacent the core of the fruit.

The spindles are positioned below the table 1 in axial alignment with the openings 22 and are adapted to move with the table. They are also capable of vertical up and down movement, operated by any convenient means at desired stations or points in the cycle of operation. For example, the spindles may be raised to penetrate the fruit immediately after stubbing and before drilling, or they may be raised between stations 4 and 5 or at station 5 before making the spherical cut. They may be lowered again after the spherical cut is made or at the time the meat and rag are discharged from the peel.

This spindle support will be found particularly advantageous during the latter portion of the spherical cutting operation and while the knife is being withdrawn, as it will support the radial membrane structure in its vertical position and reduce the possibility of the knife digging into and mutilating the meats. The spindle will also serve to advantage by holding the rag or radial membrane structure after removal thereof and the meat segments from the band of peel, allowing the meat segments to fall away from the rag and thereby assist in segregating meats from the rag.

The modified method heretofore referred to may be cyclically carried out in a series of steps, such as diagrammatically indicated in Figure 13, by a machine having an intermittently rotated fruit carriage 1A, similar to the carriage 1, and provided with a circular series of chucks 3A, similar to the chucks 3. Whole fruit is centered and positioned in the chucks 3A at the loading station (station 1), with the polar axis of the fruit vertical, and advanced by the carriage to a coring operation at station 2. As the fruit is passed from station 1 to station 2, it passes between a pair of parallel stubbing knives 9A, similar to the knives 9. In carrying out this method, preferably the knives 9A are spaced closer together than the knives 9 to remove a larger portion of the polar ends of the fruit, leaving a center section surrounded by a continuous band of peel.

At station 2, a rotary coring tool 30 (see Fig. 14) is brought into operation. This tool may conveniently comprise a cylinder having a sharpened end and a diameter slightly in excess of the cross sectional region of the fruit occupied by seed. The coring tool 30 has a rotary motion about a vertical axis coinciding with the polar axis of the fruit section and, in addition, an axial down and up feed movement which serves to cut a cylindrical plug out of the center of the fruit on the down-stroke. On the up-stroke, the removed plug may be ejected from the coring tool by a suitable ejecting plunger such as diagrammatically indicated at 31.

The cored fruit section is next advanced to station 3 where a tool 32, such as shown in Figure 17, is brought into operation to sever meat portions from the membrane and peel. The tool 32 may be made of relatively thin springy sheet metal such as stainless steel, and comprises a flat shank 33 which terminates, at its lower end, in a tapered, somewhat blunt point 34. The width of the shank 33 may be about equal to the width of an average fruit segment at the peel face. Adjacent the tapered end of the shank 33, wing elements 35 are bent from opposite edges of the shank at acute angles to the face of the shank. The wings 35 converge toward each other correspondingly approximately to, or slightly greater than, the included angle of the average segment, such as shown in Figure 16. The lower ends of the wings 35 are tapered upwardly from their juncture with the shank and have a width slightly in excess of the width of the radial membranes from the stubbed end of the fruit section to the cored out portion. Preferably, the wings are unjoined to the shank except in a small area adjacent their lower ends as shown at 36 to provide a rather resilient connection between shank and wings. Preferably, all edges of the shank and wings are dull to avoid cutting the membrane.

The upper end of the shank 33 may be connected to a vertically reciprocating carrier (not shown) by means of which the tool may be fed downwardly through the fruit section.

The point 34 should enter the meat of the segment closely adjacent the outer membrane thereof, and, because of the diversity of fruit sizes, a guiding element is provided in conjunction with the tool. This guiding element may comprise a flat strip 37 having a longitudinally sliding connection with the shank 33, such as indicated by the slot and pin structure 38. The lower end of the strip 37 is offset from the shank 33 bent outwardly from the shank, at right angles thereto, and at a point slightly below the point of the shank (when the guiding element is in its lowered position with respect to the shank 33 as shown in Figure 17) a distance slightly in excess of the peel thickness of the fruit, and then downwardly and away from the shank 33 at an angle or curve.

From the foregoing, and by reference to Figure 15, it will be seen that as the tool is moved toward the fruit section, the offset, angular end of the guiding member will first engage the upper edge of the peel. Preferably, the free end of the tool is urged toward the center of the fruit and the guiding member engaging the peel on the first part of the down-stroke, will draw the point 34 outwardly to engage the segment just inside the outer membrane. Continued downward movement will cause the shank to move relatively with respect to the guiding element and the pointed end 34 will penetrate the meat, its dulled, tapered edges centering the shank between the radial membranes. In this connection, it will be understood that the shank may have a flexible connection with its carrier to permit a certain amount of side movement of the point. As the point 34 passes downwardly through the meat, the wings 35 will also cut through the meat along planes paralleling and closely adjacent the radial membranes, and when the tool reaches the bottom of its stroke, a chunk of the meat having a generally trapezoidal cross section will be severed from the membrane as shown in Figures 15 and 16.

A group of these tools 32, for example ten, arranged in a circle with the wings directed generally radially toward the center, may be operated as a unit to cut out a corresponding number of the meat chunks simultaneously. Alternately, however, a single tool may be employed and advanced between strokes about the axis of the fruit section through angles substantially equal to the average apex angles of the segments and the meat portions cut out one by one.

After the above operation, the peel with the outer and radial membrane and possibly some of the smaller segments attached, is advanced to station 4 where a juice extraction operation may be carried out by a rubbing tool 26A similar to the tool 26 described above. The chuck and peel are then advanced toward the starting point, or station 1, during which the chuck is opened and the peel released preparatory to chucking another fruit.

While described in connection with a cyclically operating machine, the above methods may obviously be carried out by individual hand operations. Likewise, while the operating tools are described as being fed relatively with respect to stationary fruit, the fruit may be moved relative to the tool, if desired; or for the different operations, either of these relative movements may be employed as found convenient.

From the foregoing, it will be seen that we have devised a new process of segmenting citrus fruit, and removing other desired constituents therefrom, in which an equatorial band of peel is left intact on the fruit to support the meat and membrane during the procedural steps and serves as a means for holding the fruit during such operations. It will be understood, however, that only preferred procedural steps are set forth and only preferred apparatus for carrying out the process is shown and described by way of example, and that various changes may be made by those skilled in the art, such as in the order of the steps and in the parts and combinations of the apparatus, without departing from the spirit of the invention or exceeding the scope of the appended claims.

We claim:

1. A method of removing well defined bodies of membrane-free meat portions from citrus fruit comprising exposing the meat of the fruit segments at opposite poles of the fruit while leaving a continuous equatorial band of peel intact on the fruit, then severing completely well defined bodies of meat from the membranes defining the fruit segments, removing said bodies from said peel, and then rupturing the juice sacs remaining after removal of said meat to extract juice from said remaining juice sacs.

2. A method of removing well defined bodies of membrane-free meat portions from citrus fruit comprising exposing the meat of the fruit segments at opposite poles of the fruit while leaving a continuous equatorial band of peel intact on the fruit, then severing completely well defined bodies of meat from the membranes defining the fruit segments, removing said bodies from said peel, and then rupturing the juice sacs remaining after removal of said meat to extract juice from said remaining juice sacs by pressure exerted radially outward with respect to the axis of said band of peel.

3. A method of removing well defined bodies of membrane-free meat portions from citrus fruit comprising exposing the meat of the fruit segments at opposite poles of the fruit while leaving a continuous equatorial band of peel intact on the fruit, then severing completely well defined bodies of meat from the membranes defining the fruit segments, removing said bodies from said peel, and then rupturing the juice sacs remaining after removal of said meat to extract juice from said remaining juice sacs by pressure exerted radially outward with respect to the axis of said band of peel while supporting the band of peel by pressure exerted substantially normal to the outer surface thereof.

4. A method of removing well defined bodies of membrane-free meat portions from citrus fruit comprising exposing the meat of the fruit segments at opposite poles of the fruit while leaving a continuous equatorial band of peel intact on the fruit, then severing completely well defined bodies of meat from the membranes defining the fruit segments, removing said bodies from said peel, and then rupturing the juice sacs remaining after removal of said meat to extract juice from said remaining juice sacs by a circumferential rubbing action within said band of peel and having a pressure component in a direction radially outward with respect to the axis of said band of peel.

5. A method of removing substantially whole meat segments from citrus fruit comprising removing a portion of the peel and outer membrane adjacent at least one pole of whole fruit to expose the meat of the fruit segments, then severing the meat from both radial membranes of the segments along lines adjacent the inner surfaces of the radial membranes and from the apex of the segments to the outer membrane thereof, then severing the meat and radial membranes from the outer membranes along lines closely adjacent the inner surface of said outer membranes, removing the severed meat segments and radial membranes from said peel and extracting the juice from juice sacs remaining in the peel after said removal.

6. A method of removing substantially whole meat segments from citrus fruit comprising removing polar cap portions of the peel and outer membrane from opposite ends of whole fruit to expose the meat of the fruit segments while leaving said segments attached to an equatorial band of peel surrounding the same, completely severing meat of segments from both radial membranes thereof by a successive series of radial cuts made first adjacent the inner surface of one radial membrane of the segments and then adjacent the opposite radial membrane of said segments, and then severing the meat portions and radial membranes from the outer membranes and peel.

7. A method of removing well defined membrane-free meat bodies from citrus fruit comprising removing opposed polar cap portions from whole fruit along parallel planes perpendicular to the polar axis thereof and substantially below the polar ends of the fruit segments to leave a center section of the fruit surrounded by a band of peel, forming a substantial axial void in the center section to remove seed and the apex portions of the segments, then severing bodies of the meat from the remaining portions of the radial membranes and outer membranes of the segments on planes adjacent the said membranes, and extracting juice from sacs remaining attached to said membranes after removal of said meat bodies.

8. A method of removing well defined membrane-free meat bodies from citrus fruit comprising removing opposed polar cap portions from whole fruit along parallel planes perpendicular to the polar axis thereof and substantially below the polar ends of the fruit segments to leave a center section of the fruit surrounded by a band of peel, forming a substantial axial void in the center section to remove seed and the apex portions of the segments, then severing bodies of the meat from the remaining portions of the radial membranes and outer membranes of the segments on planes adjacent the said membranes while leaving said membranes attached to the peel, and extracting juice from sacs remaining attached to said membranes after removal of said meat bodies while supporting said center section by said band of peel.

9. A method of removing well defined bodies of membrane-free meat portions from citrus fruit comprising exposing the meat of the fruit segments at opposite poles of the fruit while leaving a continuous equatorial band of peel intact on the fruit, then severing meat portions from the radial membranes of the segments while leaving the radial membrane structure intact, and then severing the meat portions and radial membranes from the outer membranes of the segments and the band of peel, removing the meat portions and radial membrane structure from said band of peel, supporting said membrane structure, and segregating the meat portions from said membrane structure.

RALPH POLK, Sr.
RALPH POLK, Jr.

REFERENCES CITED

The following references are of record in the file of this patent:

UNITED STATES PATENTS

| Number | Name | Date |
|---|---|---|
| 1,389,765 | Krots | Sept. 6, 1921 |
| 1,452,930 | Polk | Apr. 24, 1923 |
| 1,542,352 | Ankeny | June 16, 1925 |
| 1,825,628 | Floyd et al. | Sept. 29, 1931 |
| 1,844,810 | Taylor | Feb. 9, 1932 |
| 2,199,345 | Polk, Sr., et al. | Apr. 30, 1940 |
| 2,240,909 | Polk, Sr., et al. | May 6, 1941 |
| 2,468,282 | Wood | Apr. 26, 1949 |